United States Patent
Ludwig et al.

(10) Patent No.: US 7,035,237 B2
(45) Date of Patent: Apr. 25, 2006

(54) DATA UNIT SENDING MEANS AND CONTROL METHOD

(75) Inventors: Reiner Ludwig, Düren (DE); Bela Rathonyi, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/866,832

(22) Filed: Jun. 15, 2004

(65) Prior Publication Data

US 2004/0233883 A1  Nov. 25, 2004

Related U.S. Application Data

(63) Continuation of application No. 09/577,876, filed on May 25, 2000, now Pat. No. 6,816,471.

(30) Foreign Application Priority Data

May 27, 1999  (EP) .................. 99109283

(51) Int. Cl.
*H04Q 7/00* (2006.01)

(52) U.S. Cl. .................. 370/331; 370/469

(58) Field of Classification Search ........ 370/328, 370/329, 331, 332, 333, 349, 428, 429, 466, 370/467, 468, 469, 236, 235
See application file for complete search history.

(56) References Cited

U.S. PATENT DOCUMENTS 6,160,804 A * 12/2000 Ahmed et al. .............. 370/349
6,188,671 B1 * 2/2001 Chase et al. ............... 370/232
6,301,479 B1 * 10/2001 Roobol et al. .............. 455/436
6,400,712 B1 * 6/2002 Phillips ..................... 370/355
6,463,285 B1 * 10/2002 Davies et al. .............. 455/436
6,532,211 B1 * 3/2003 Rathonyi et al. ........... 370/230
6,542,490 B1 * 4/2003 Ahmadvand et al. ....... 370/338
6,816,471 B1 * 11/2004 Ludwig et al. ............. 370/331

FOREIGN PATENT DOCUMENTS

EP      0 572 865 A2   12/1998
WO      96/21984 A2    7/1996
WO      99/35798 A1    7/1999

OTHER PUBLICATIONS

Ayanoglu et al, "AIRMAIL: A Link-Layer Protocol for Wireless Networks", 8452 Wireless Netowrks, Feb. 1, (1995, No. 1, Amsterdam, NL, pp. 47-59.

* cited by examiner

*Primary Examiner*—Kwang Bin Yao
(74) *Attorney, Agent, or Firm*—Nixon & Vanderhye, P.C.

(57) ABSTRACT

The present invention relates to a data unit sending means and a method for controlling a data unit sending means, where data units of a first protocol (L2_ARQ) embed data units of a second protocol (L3) belonging to a higher layer, and said data units of said first protocol (L2_ARQ) are held in a send buffer means. According to the invention, the data units of the second protocol (L3) are discriminated, and the data units of the first protocol (L2_ARQ) that embed a particular data unit of the second protocol (L3) are associated with said particular data unit of the second protocol (L3), and the contents of the send buffer means is managed in accordance with said association.

7 Claims, 6 Drawing Sheets

*FIG.5*

| L 3 # 1 | L 3 # 2 | L 3 # 3 |
|---|---|---|

| L 2 # 1 | L 2 # 2 | L 2 # 3 | L 2 # 4 | L 2 # 5 |
|---|---|---|---|---|

US 7,035,237 B2

DATA UNIT SENDING MEANS AND CONTROL METHOD

This application is a continuation of U.S. patent application Ser. No. 09/577,876 filed May 25, 2000 now U.S. Pat. No. 6,816,471 entitled "Data Unit Sending Means and Control Method".

BACKGROUND OF THE INVENTION

The present invention relates to a data unit sending means and a method for controlling a data unit sending means.

In the field of communications, the concept of packet exchange is well known. A data packet is a given length of data whose structure is determined by a given protocol, i.e. a set of rules governing the exchange, manipulation and interpretation of such packets. Depending on the protocol, different names are used, such as frame, packet, etc. A more generic term is protocol data unit (PDU), and the following description shall use the term data unit for simplicity.

The process of sending data via a packet exchange typically comprises a plurality of protocols, which are arranged in a hierarchy. A schematic example of such a hierarchy is shown in FIG. 6. The example of FIG. 6 shows three layers, a higher layer referred to as $L_3$, a layer below L3 referred to as L2_ARQ, and a lowest layer L1. In fact, the terms L3, L2_ARQ and L1 refer to protocols associated with these layers. As an example, L3 can be the internet protocol IP, L2_ARQ may be the radio link protocol RLP known from GSM, and L1 can be any suitable physical layer protocol.

In accordance with the concept of layering, data units associated with a higher layer are passed to a lower layer, e.g. from L3 to L2-ARQ in example of FIG. 6, where the lower layer protocol embeds the higher layer data units.

The term "embedding" may refer to encapsulation or segmentation. In the case of encapsulation, a higher layer data unit is placed into one lower layer data unit, whereas in the case of segmentation, the higher layer data unit is segmented into smaller pieces of data, each piece being placed into a lower layer data unit.

One of the important aspects of protocol layering is that in a data communication, i.e. in a process where a given amount of data is being sent from a source to a destination, the overall path that is associated with a highest layer comprises sublinks associated with the lower layer protocols, where the endpoints of a protocol of a given layer are called peers of said protocol. This concept is well known in the art and does not need to be described further here. Reference is made e.g. to the book "TCP/IP, The Protocols" by W. R. Stevens, Edison Wesley 1996.

PROBLEM UNDERLYING THE INVENTION

Specific problems in connection with the transmission of data occur in radio networks, due to the fact that radio links typically have a poorer transmission quality than fixed lines. For the purpose of explanation, FIG. 3 shows the architecture for a generic cellular communication system. This system consists of a core network (CN) 100, and a part referred to as a radio access network (RAN) 110. The radio access network is divided into controller nodes 101 and base transceiver stations (BTS) 102. The hierarchy of the network is such that the core network is connected to several controllers and the controllers are connected to several base stations. The base stations 102 communicate with mobile stations (MS) 103.

A typical problem that will occur when sending data in the up-link direction (i.e. from a mobile station 103 to a base transceiver station 102) or in the down-link direction (from the base transceiver station 102 to a mobile station 103) is that errors are introduced over the radio interface. Such errors are typically due to changes in the transmission quality, e.g. because the mobile station 103 moves around. Another potential situation for data loss is a handover of a communication between a given mobile station 103 and a given base transceiver station 102 to another base transceiver station, when the mobile station moves into another cell. Both situations, namely a specific error condition or a handover lead to the necessity of a link reset, in the course of which all data in the send buffer of the sending peer of the radio link is purged to thereby establish a "clean slate", such that communication may begin anew in a state unambiguously defined for both sender and receiver.

Due to the error characteristics of the radio interface, a so-called ARQ protocol (ARQ=Automatic Repeat reQuest) can optionally be executed between the mobile station and the radio access network to reduce the residual error rate. An ARQ protocol comprises the function of acknowledging the correct receipt of data units by the receiving peer, where the sending peer implements mechanisms for retransmitting such data units that were not correctly received. In this way, the complete transmission of data is secured. It may be noted that the use of an ARQ mechanism can be an option associated with a specific mode, i.e. that not every data unit needs to be sent with the ARQ mechanism activated. As an example, in connection with known protocols there are known a so-called numbered mode (or I-mode) in which ARQ is activated, and a so-called unnumbered mode, in which no acknowledgment and consequently no retransmission occurs.

The first mode is advantageous for data where secure transmission is a priority, the second mode is advantageous for data where delay sensitivity is a priority and data loss is not so much of a problem, such as real-time voice-over-Internet data.

In the following, two known types of solutions for securing user data from being lost in case of a handover of a ARQ protocol communication between different network nodes will be described.

According to a first solution, a protocol state transfer is enacted, i.e. when a handover is performed, the whole state including state variables and buffers is moved from the ARQ entity in the RAN (i.e. the peer) to the new network node. Using this mechanism, the ARQ entity in the mobile station does not need to know when a handover occurs. Such a solution is described e.g. in R. Cohen, B. Patel and A. Segall, "Handover in a Micro-Cell Packet Switched Mobile Network", ATM Journal of Wireless Networks, Volume 2, no. 1, 1996, pages 13–25, or in S. Powel Ayanoglu, T. F. La Porta, K. K. Sabdani, R. D. Gitlin, "AIRMAIL: A link layer protocol for wireless networks", ATM/Baltzer Wireless Networks Journal, Volume 1, 1995, pages 47–60.

The benefits of this solution are that no unnecessary re-transmission of user data over the radio interface occurs, and the ARQ protocol in the mobile station can be unaware of the handover, which makes the implementation less expensive.

The disadvantage of this solution is, that it is limited to handle intra-system handover. This means that both network nodes between which the handover is executed must operate in accordance with the same protocol. If a core network is connected to multiple radio access networks of different type, which do not use exactly the same ARQ protocol, this solution cannot be used, because an inter-system handover is necessary. Such situations will become more common in the future.

A different solution for securing user data is that of providing an additional ARQ protocol. In this case, one ARQ protocol is run between the mobile station and the radio access network (the base station controller node) and takes care of errors encountered of the radio interface. The second ARQ protocol is run between the mobile station and the core network. In case of data loss due to resetting the link between the mobile station and the base station controller (be it due to an error condition or a handover), this second ARQ protocol will perform a re-transmission. As an example, in GPRS (General Radio Packet Service) the first ARQ protocol is called RLC (Radio Link Control Protocol) and the second ARQ protocol is called LLC (Link Layer Control Protocol).

Although such an arrangement enables the handling of inter-system handovers, it has disadvantages. First of all, additional radio resources are consumed due to the overhead introduced by the second ARQ protocol. As an example, in GPRS the overhead per transmitted L3 data unit introduced by the LLC protocol is in the order of 7 bytes. Compared to the size of a Van Jacobson compressed TCP acknowledgment, which is under 10 bytes, the size will almost be doubled when transmitting TCP acknowledgments (in a L3 data unit). Also, the implementation of two ARQ protocols in the mobile station leads to higher costs in terms of memory and processing power.

OBJECT OF THE INVENTION

The object of the present invention is to provide a data sending means and a corresponding control method that secure data transmission, but which are applicable to intra-system handovers and inter-system handovers without adding unnecessary overhead. It may be noted that this object is not restricted to radio networks, because the avoidance of band-width waste is advantageous in any network. However, radio networks are a preferred application of the invention to be described in the following.

SUMMARY OF INVENTION

This object is achieved by the subject matter described in the independent claims. Advantageous embodiments are described in the dependent claims.

In accordance with the present invention, a data unit sending means that operates in accordance with an ARQ protocol, referred to generically as L2_ARQ in the following, embeds higher layer data units of a protocol L3. L3 data units are discriminated, the L2_ARQ data units in which L3 data units are embedded are associated with the L3 data units embedded therein, and the contents of the send buffer are managed in accordance with the association.

The process of handling the data units will be explained in a general way in connection with FIG. 1. The L3 data units or PDUs are received (step S1) and then discriminated (step S2). Discrimination means that individual L3 data units are identified such that one may be discriminated from the other. It may be noted that this feature departs from the conventional approach of making separate protocol layers completely transparent to one another, because in the present invention the L2_ARQ protocol is made "intelligent" in the sense that it may discriminate and differentiate individual L3 data units.

After the discrimination, the L3 data units are embedded (i.e. encapsulated or segmented) into one or more L2_ARQ data units (step S3). Then, the L2_ARQ data units are brought into association with the higher layer L3 data units that they form. In other words, a record is kept of which L2_ARQ data units belong to which L3 data unit.

Then, the L2_ARQ data units are placed into a send buffer, where the sending to the receiving L2_ARQ peer is performed in accordance with any suitable or required flow control method. For example, a widely used flow control method is that of window-based flow control. The precise method and its details will be determined by the specific L2_ARQ protocol, such that this is of no importance to the present invention.

In accordance with the present invention, however, the management of the send buffer is performed in accordance with the association between the L2_ARQ data units and the higher layer L3 data units that have been embedded in the L2_ARQ data units. The term management refers to how the contents of the buffer is controlled, i.e. under which conditions which data units are deleted.

It may be noted that the order of steps indicated in FIG. 1 is only an example, and the basic principle of the invention as specified by the claims may be implemented in any suitable way.

By managing the contents of the send buffer, i.e. controlling the deleting of data units therein in accordance with the association between L2_ARQ data units and the higher layer L3 data units embedded therein, it is possible to achieve data transmission security without two layers of ARQ protocols and nonetheless enabling inter-system handover. This is due to the fact that by managing the buffer in accordance with the association of L3 data units and L2_ARQ data units, any loss of L3 data units can be avoided at the L2_ARQ level. As a consequence, an ARQ mode above the L2_ARQ level is superfluous. At the same time, as the loss of data is avoided by a mechanism implemented around the send buffer, an inter-system handover poses no problem.

It should be noted that the L2_ARQ protocol does not necessarily send all data units in an ARQ mode. Much rather, the invention is applicable to any protocol, i.e. also such protocols that provide transmission modes in which no re-transmission occurs. However, according to a preferred embodiment, the buffer management for such L2_ARQ data units that are sent in an ARQ mode is performed in such a way that a given L2_ARQ data unit is only deleted from the send buffer means if acknowledgments for all L2_ARQ data units associated with the same L3 unit as said given L2_ARQ data unit have been received. In this way, all L2_ARQ data units belonging to one L3 data unit are held in the send buffer until the last L2_ARQ data unit associated with that L3 data unit has been acknowledged, i.e. until all L2_ARQ data units associated with a particular L3 data unit have been acknowledged.

Then, in the event of a reset, i.e. a resetting of the numbering of L2_ARQ data units, or a handover, the L2_ARQ data units belonging to the last L3 data unit for which not all L"_ARQ data units have been acknowledged will simply be sent again. In this way, a part of said L3 data unit may be sent twice, but in any case the L3 data unit is sent completely, such that no retransmission on the L3 level or higher (e.g. TCP) is necessary. In the event of a handover, the L3 data units in the send buffer may simply be transferred to the new node, regardless of said new node operating according to the same L2_ARQ protocol or a different one. In other words, an inter-system handover is no problem, because no other information besides the buffer contents (in terms of L3 data units), such as state variables, etc., must be handed over.

The present invention will now be described on the basis of preferred and detailed embodiments that serve the purpose of explaining the invention and are not to be seen as restrictive. Reference will be made to the accompanying figures, in which FIG. 1 describes the control of a data unit sending means according to a basic example;

FIG. 5 is an explanatory diagram for explaining the association between L3 data units and L2 data units.

DETAILED DISCLOSURE OF THE INVENTION

Figure 2:
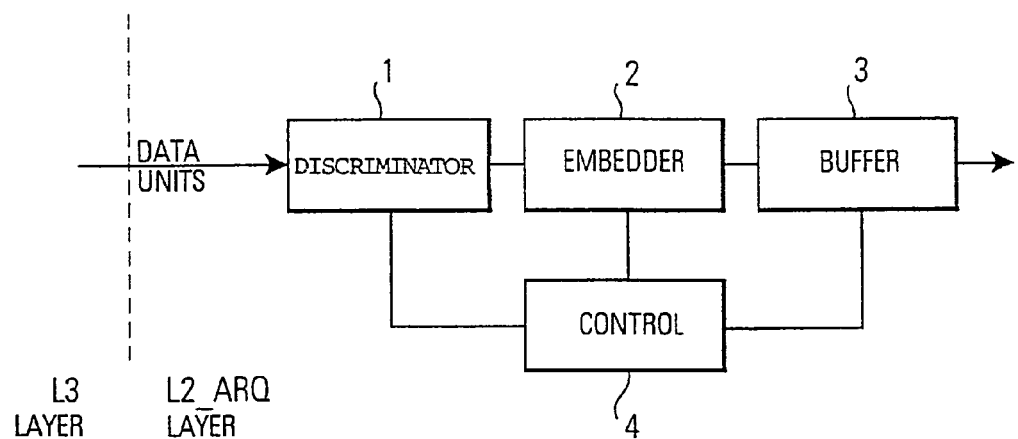
FIG. 2 is a schematic representation of a data unit sending means according to the invention.
Figure 3:
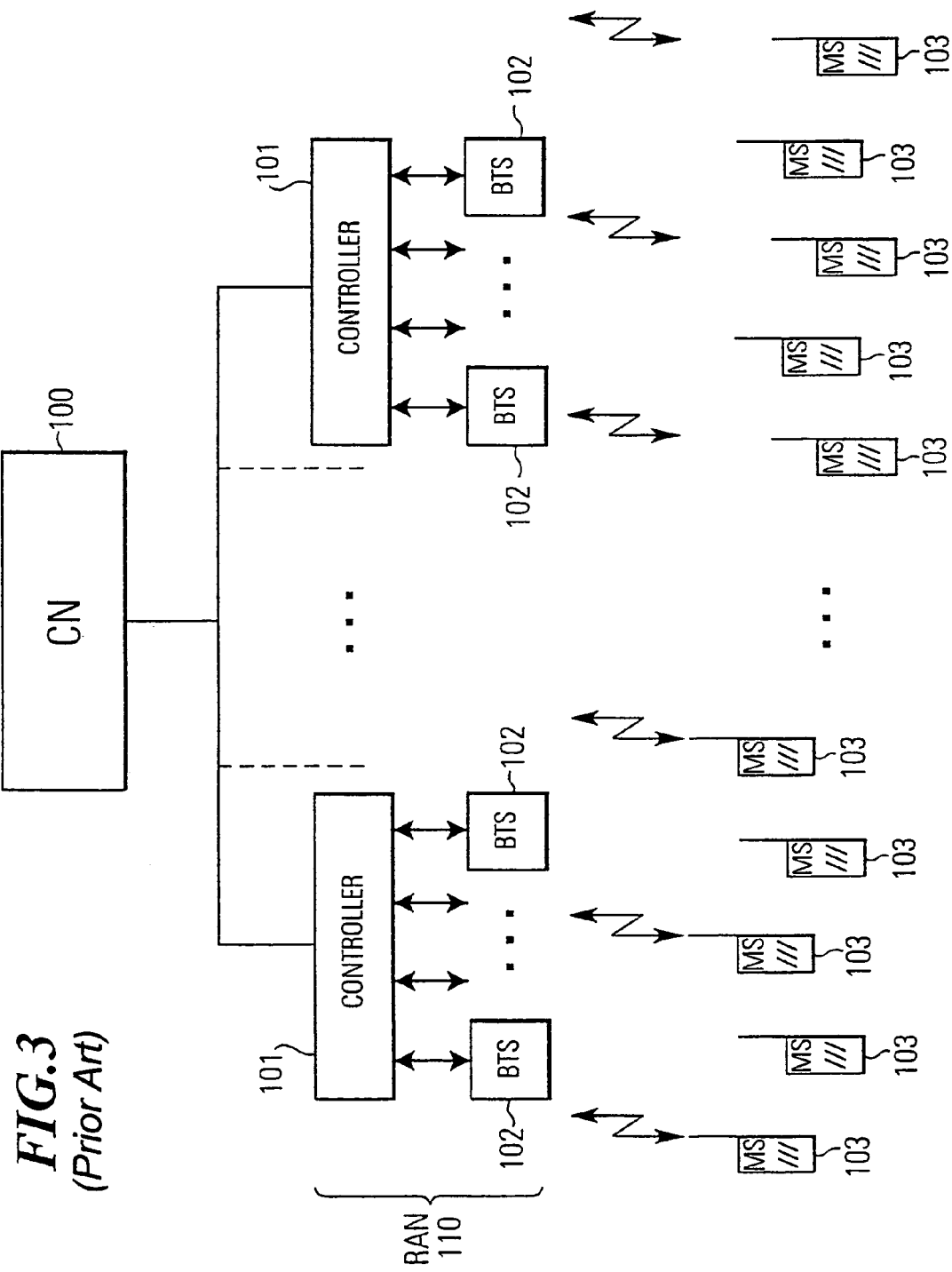
FIG. 3 shows the architecture of a generic cellular communication system.

FIG. 2 schematically shows the arrangement of elements for embodying a data unit sending means of the present invention. 1 refers to a discriminator, 2 to an embedder, 3 to a buffer and 4 to a control means. As can be seen, data units from the L3 layer arrive and are discriminated by discriminator 1 at the L2_ARQ layer. The discrimination result is passed to the control means 4, that then performs the association of L2_ARQ data units generated in the embedder 2 with the L3 data units. Then the L2_ARQ data units are passed to the buffer 3, where the management of the buffer contents is performed in accordance with the association between the L2_ARQ data units and the higher layer L3 data units that they embed. As already mentioned previously, the specific flow control performed by the control means 4 will depend on the specific L2 ARQ protocol.

Figure 1:
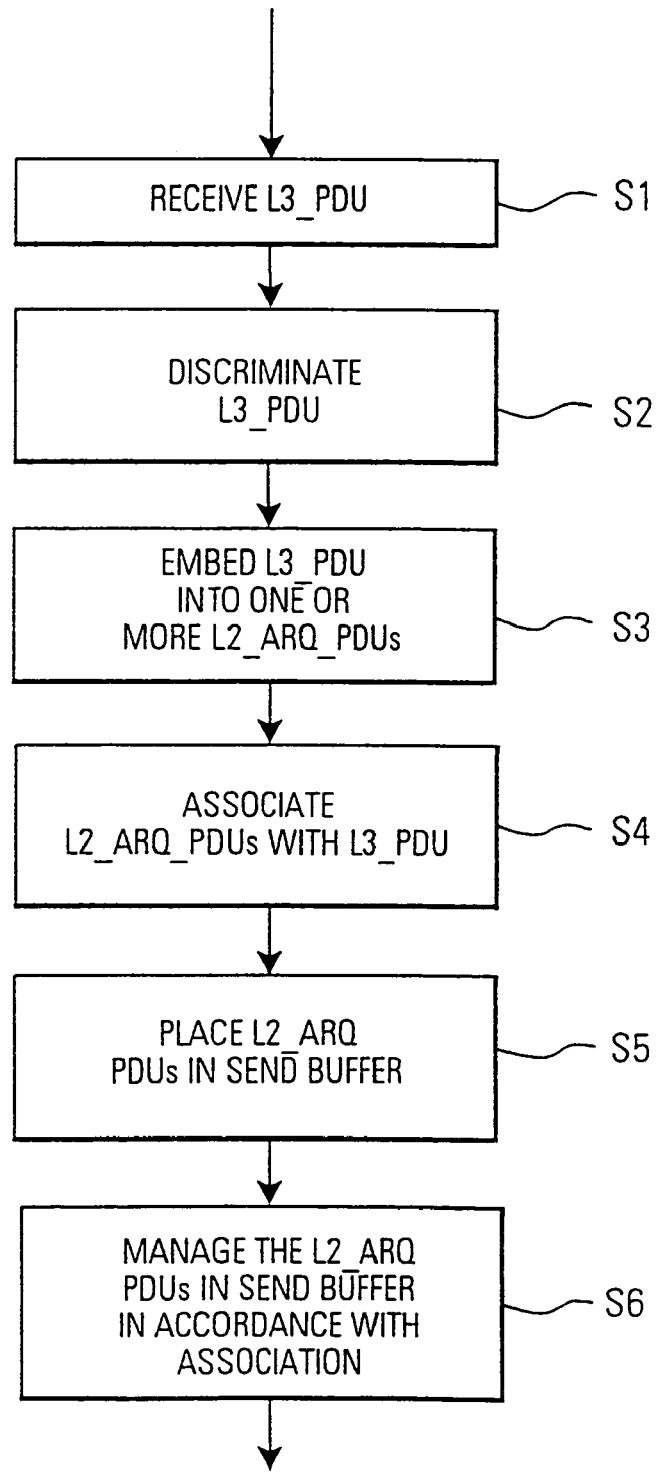

As already mentioned in connection with FIG. 1, the structure shown in FIG. 2 is only a schematic example for the purpose of explanation, and other arrangements are possible, which the skilled person will choose as is suitable or desired.

For the purpose of the following description of detailed embodiments, it will be assumed that the L2_ARQ protocol provides two reliability modes for the transmission of data units, namely one with acknowledgment and re-transmission, and another without re-transmission. The first mode, which is an ARQ mode, will be referred to as the numbered mode or I-mode, whereas the second will be referred to as the unnumbered mode or UI-mode. It will also be assumed that the buffer will contain respective queues associated with the modes. In other words, there will be an I-queue and an UI-queue. Naturally, the present invention is by no means restricted to such an arrangement, as there may be a larger number of reliability modes, such as unreliable, semi-reliable and fully reliable, and there can be a corresponding number of queues in the buffer. The semi-reliable or fully reliable transmission modes can either be combined with in-sequence or out-of-sequence delivery, as will be explained in more detail further on.

Figure 6:
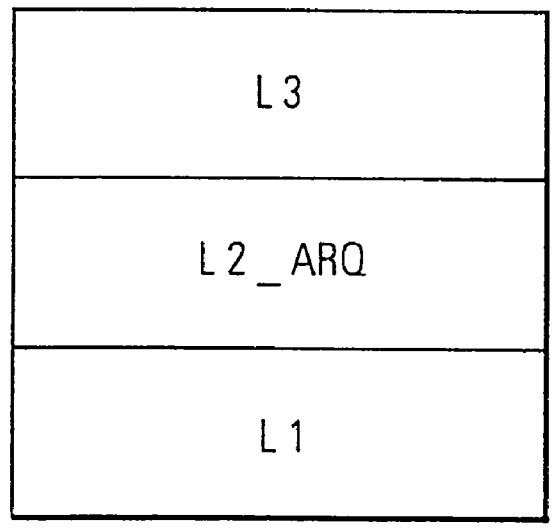
FIG. 6 is a representation of a generic protocol stack.

The following embodiments will be described on the basis of the protocol arrangement shown in FIG. 6, where L3 is used to refer to any network protocol, e.g. the internet protocol IP. It may be that the L3 data units are embedded in a specific framing scheme, as e.g. provided by the point-to-point protocol PPP. Thus, L3 refers to any protocol that produces a corresponding data unit that is transferred to the layer below, i.e. the L2_ARQ layer.

As already discussed above, the L2_ARQ layer refers to a link layer protocol that embeds L3 data units into L2_ARQ data units, where the embedding preferably is a potential segmentation of larger L3 data units into smaller L2_ARQ data units and/or concatenation of several L3 data units into L2_ARQ data units. As mentioned above, the L2_ARQ protocol implements at least two modes, namely an ARQ mode (I-mode), and a non-acknowledged mode (UI-mode). The basic concept of an ARQ mode such as the I-mode is well known in the art, such that a further description of details is not necessary. It is sufficient to say that the L2_ARQ protocol contains rules for how the re-transmission of L2_ARQ data units is done, on the basis of the presence or absence of acknowledgment messages and retransmission requests for specific data units. As is necessary for any ARQ mechanism, the L2_ARQ data units sent in accordance with the acknowledgment mode are buffered in the send buffer, where they must at least be held until their correct receipt has been acknowledged. The preferred buffer management mechanism of the present invention shall be described further on.

Figure 4:
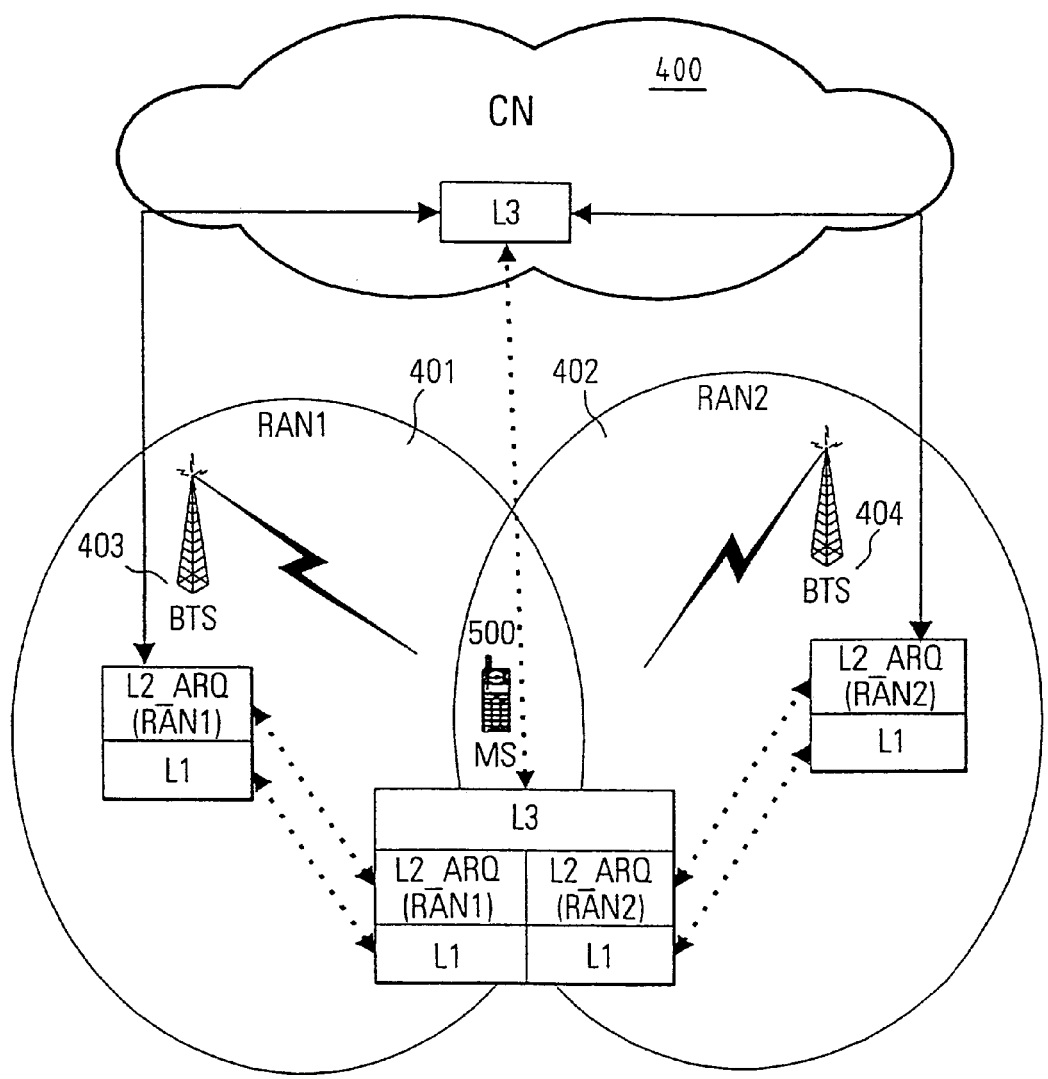
FIG. 4 is an explanatory diagram for describing a detailed example of the invention.

For better explaining the invention, reference will be made to the architecture of a generic communication system as shown in FIG. 4. As can be seen, a mobile station (MS) 500 has an L3 peer that communicates with a corresponding counterpart in the core network (CN) 400. The core network 400 is connected to two different radio access networks 401 and 402. Each radio access network comprises a plurality of radio access network nodes, such as e.g. base station controllers (BSC) and base transceiver stations (BTS), where the schematic representation of FIG. 4 only shows one base transceiver station 403, 404 for each of the radio access networks 401 and 402, for the purpose of simplicity. Also, it may be noted that the core network can be connected to more than two radio access networks.

There exist two peer entities of the L2_ARQ protocol, one running in the mobile station 500 and one in the respective radio access network 401 or 402. In the example of FIG. 4, each radio access network has its own L2_ARQ protocol, referred to as L2_ARQ(RAN1) for radio access network 401 and as L2_ARQ(RAN2) for radio access network 402.

FIG. 4 also shows a physical layer protocol L1 provided below the L2_ARQ protocol. The L1 peers are directly associated with the physical connection, i.e. the transceiver in the mobile station 500 and the transceiver in the base transceiver station 403 or 404, whereas the L2_ARQ protocol entity on the network side resides in a network node of the respective radio access network.

It will be assumed that a reset of the link between two L2_ARQ peers can occur, e.g. due to a predetermined error condition. More specifically, a link reset will lead to the data unit numbering being reset, to thereby be able to start communication anew. There are different error conditions that may lead to such a resetting of the data unit numbering, for example if a given data unit has been re-transmitted a predetermined number of times, without an acknowledgment having been received. Another error condition can be that an acknowledgment is received for a data unit that was never sent. Both cases indicate that the link is strongly disturbed, such that a reset is necessary. In conventional systems, the data contained in the send buffer is simply purged in the course of a reset, to thereby give the sending peer and receiving peer an unambiguously defined starting situation.

Another potential data loss situation is that of a handover, where a communication is handed from one network node of a radio access network to another. Such a handover may be either inside of a given radio access network (intra-system) or may be between two different types of radio-access networks (inter-system). When a handover occurs, this may result in moving the execution point for the L2_ARQ protocol entity to a new physical node where a L2_ARQ entity will be started and continue the communication with a new L2_ARQ peer. As can be seen in FIG. 4, this means that in an inter-system handover, the communication not only needs to be handed over from e.g. base station 403 to base station 404, but a handover will also occur inside of the mobile station 500, as the transmission must be handed from L2_ARQ (RAN1) to L2_ARQ (RAN2). In any case, a handover will include a link reset, as the two peers of the communication require a defined starting point.

Now the preferred buffer management of the send buffer for a sending peer (be it in the mobile station, or be it in a network node) will be described. The sender of both L2_ARQ entities in a system is only allowed to delete L2_ARQ data units from its send buffer when all L2_ARQ data units associated with a whole L3 data unit have been acknowledged by the peer entity. If concatenation of L3 data units is used, a L2_ARQ data unit may not be deleted if it includes a segmented L3 data unit that was not fully received. Further, if the peer L2_ARQ receiver uses in-sequence delivery, the L2_ARQ sender is only allowed to remove the L2_ARQ data units using in-sequence removal.

Figure 5:
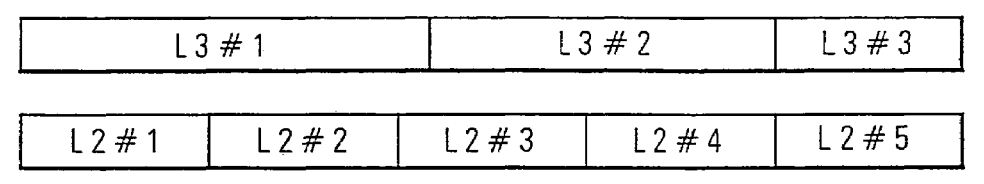

This basic principle will be explained in more detail in connection with FIG. 5. FIG. 5 shows a simple example for the segmentation/concatenation of L3 data units into L2_ARQ data units. An L2_ARQ protocol entity has segmented three L3 data units, denoted L1#–L3 # into five L2_ARQ data units, denoted L2#1–L2#5. As may be seen, L3#1 is segmented into L2#1–L2#3, L3#2 is segmented into L2#3–L2#4, and finally L3#3 is completely enclosed in L2#5.

The following table 1 shows examples of the contents of the L2_ARQ send buffer when different data units have been acknowledged by the peer entity. The sender works according to the above-described mechanism, i.e. L2_ARQ data units are only deleted if complete L3 data units have been acknowledged. Table 1 indicates the differences for in-sequence and out-of-sequence delivery.

| Acknowledged PDUs by peer (L2#x) | | | | | Send buffer contents | |
|---|---|---|---|---|---|---|
| (L2#x) | | | | | In-sequence delivery | Out-of-sequence delivery |
| 1 | 2 | 3 | 4 | 5 | | |
| x | x |   | x | x | 1–5 | 1–4 |
| x | x | x |   | x | 3–5 | 3–4 |
| x | x | x | x |   | 5 | 5 |
|   |   | x | x | x | 1–5 | 1–3 |
|   |   | x | x |   | 1–5 | 1–3, 5 |
|   |   |   |   | x | 1–5 | 1–4 |
| x | x | x | x |   | 5 | 5 |
|   | x | x | x | x | 1–5 | 1–3 |

As can be seen in the first line, in the case of in-sequence delivery all L2_ARQ data units remain in the send buffer, because the first L3 data unit L3#1 has not been completely acknowledged because L2#3 was not acknowledged. In the case of out-of-sequence delivery, the data unit L2#5 has been deleted, as the acknowledgment of L2#5 means that L3#3 has been completely acknowledged. In the second line, it can be seen that the acknowledgment of L2#1 to L2#3 means that L3#1 has been completely acknowledged, such that L2#1 and L2#2 may be deleted, but due to the fact that L2#4 has not been acknowledged, L2#3 may not be deleted as L2#3 also is associated with L3#2.

In the third line, L2#1 to L2#4 were acknowledged, i.e. L3#1 and L3#2. Consequently, only L2#5 remains in the send buffer. In the case of line 4, L2#3 to L2#5 have been acknowledged, such that L3#2 and L3#3 have been acknowledged, so that for out-of-sequence delivery only L2#1 to L2#3 remain in the buffer, whereas for in-sequence delivery all L2_ARQ data units remain, because the first unit was not acknowledged. The remaining examples are self-explanatory.

In a general sense, any time during the protocol operation, the L2_ARQ entity must be able to provide information about the contents of its send buffer in terms of the L3 data units. This information can be the identities of the L3 data units in accordance with any suitable addressing scheme, or the L3 data units themselves, where these L3 data units are those for which the associated L2_ARQ data units have not been fully acknowledged by the peer entity.

Now an example will be described, in which a link reset occurs, i.e. the resetting of the data unit numbering, without a handover. In other words, the sending and receiving peers remain the same, but the numbering of the I-mode data units is reset, e.g. due to a given error condition. In this case, the sending peer will simply renumber the L2_ARQ data units in its send buffer in such a way that the first L2_ARQ data unit of the new sequence is the first L2_ARQ data unit associated with the last L3 data unit that was not completely acknowledged. In other words, when considering the example shown in FIG. 5, if one assumes that L2#1 to L2#3 have been acknowledged, which means that L3#1 has been acknowledged, the new sequence will begin with L2#3 as its first data unit, because L3#2 was not fully acknowledged prior to the reset. In this way there is no possibility of data loss in the course of the reset.

In the example just described, the segmentation performed prior to the link reset was retained. Preferably, the link reset will be performed by additionally resegmenting the L3 data units for which not all L2_ARQ data units were acknowledged. In other words, when taking the above assumption that L2#1 to L2#3 were acknowledged, L3#2 and L3#3 would be resegmented such that the first L2_ARQ data unit of the reset sequence would only be associated with L3#2. As can be seen, this has the advantage that the end part of L3#1 is not unnecessarily retransmitted, i.e. in a general sense that there is no unnecessary retransmission of data.

It may be noted that for the above examples, it makes no difference if the sending peer is in the mobile station or the network node.

Now the situation of a handover will be described.

According to one embodiment, when a handover occurs, which results in moving the L2_ARQ protocol execution to a new physical node, the old L2_ARQ entity will be terminated and a new L2_ARQ entity will be started. Before the old entity is terminated, the contents of the send buffer, i.e. the unacknowledged L3 data units, will be transferred to the newly established L2_ARQ entity. The new entity will then resume the transmission starting with the unacknowledged L3 data units received from the terminated L2_ARQ entity.

In other words, in accordance with the present invention, the new L2_ARQ entity will start sending the first L2_ARQ data unit associated with the last L3 data unit that was not completely acknowledged prior to termination of the old L2_ARQ entity. In this way, similar to the above example of a reset without a handover, the complete transmission of all L3 data units is secured, without the necessity of running an ARQ mode on any higher level to protect against such losses. Also, due to the fact that L3 data units are passed on, an inter-system handover is no problem. In other words, no state variables need to be passed on, and the new node can handle the L3 data units in its own particular way, i.e. according to its particular L2_ARQ protocol. This especially means that the L3 data units may for example be resegmented differently in the new node.

The mechanisms with which unacknowledged L3 data units are transferred between the old and the new L2_ARQ entity may be selected in any suitable or desirable way in accordance with the specific hardware and protocols involved. In the network, the transfer of unacknowledged L3 data units can be done e.g. by "pushing back" the data units to the core network, which then takes care of the data unit delivery/transfer to the new L2_ARQ entity. This can be very useful in case of an inter-system handover, where the different radio access networks are not connected to each other. An alternative is that the old network node will directly transfer the L3 data units to the new network node, if this new node is known. This alternative is advantageous in an intra-system handover.

When the data unit sender is in the mobile station, two different handover procedures can be distinguished for the L2_ARQ entity. In case of an intra-system handover, the L2_ARQ entity will only have to perform a reset. This may involve the renumbering of already segmented L2_ARQ data units, or the resegmentation and/or reconcatanation of the send buffer contents, after which the protocol is restarted. When an inter-system handover is performed, the unacknowledged L3 data units may have to be transferred to a new L2_ARQ entity. This entity may be executed in the same physical device (mechanical/electronic piece, chip, CPU, etc.) or in a different physical device located in the same mobile station. The precise details of such a transfer from e.g. L2_ARQ (RAN1) to L2_ARQ (RAN2) of mobile station 500 in FIG. 4 will depend on the precise nature of the radio access networks, the employed protocols, the hardware of the radio network and mobile station, etc. It is clear that this can be done in any suitable or desirable way under the specific conditions of the situation.

According to another embodiment, the handover is not performed by a direct transfer of the L3 data units left in the send buffer, much rather a multicast group is formed. More specifically, a set of at least two L2_ARQ entities in the network is created, that forms a multicast group, e.g. an IP multicast group. Only one of the L2_ARQ entities from the group at a time communicates with the peer entity in the mobile station, and this L2_ARQ entity will be referred to as the "serving" L2_ARQ entity. The rest of the L2_ARQ entities in the multicast group do not have a peer-to-peer communication with the mobile station, and will be denoted as the "passive" L2_ARQ entities.

The members of the multicast group can be chosen in any suitable or desirable way. Preferably, in a cellular mobile communication system, the group includes all nodes that are potential handover candidates, i.e. those nodes associated with the cells adjacent to the cell in which the mobile station is presently located. Naturally, this is only an example, and other criteria are possible for determining the members of the group.

It may be noted that the multicast group consisting of L2_ARQ entities is not a fixed group, but may be adapted in accordance with how the mobile station moves about. For example, when the mobile station moves from one cell to another, the passive members of the multicast group are changed to those cells lying around the new cell. In other words, when the mobile station moves around in the network, a passive member of the group can be deleted and new ones may be added to the group.

There are different possibilities of using the multicast group to perform a handover. According to one alternative, the L2_ARQ peers work in the same way as previously described, i.e. those L3 data units are retained for which not all associated L2_ARQ data units have been acknowledged. Then, when the handover is performed, the unacknowledged L3 data units will be multicast to the whole group and the new serving L2_ARQ entity will resume the transmission starting with the multicast data units, i.e. the first data unit will be associated with the last L3 data unit for which not all associated L2_ARQ data units were acknowledged prior to the handover. Although this solution entails the transmitting of a larger amount of data than in the previous embodiment, it has the advantage that the serving node does not have to know to which node the L2_ARQ communication is handed over.

According to another alternative, the L2_ARQ peers again perform the buffer management as described above, until a condition occurs that indicates that a handover might have to be performed. Then, a corresponding control process predicting the handover can trigger the start of a multicast session. When the start is triggered, the L2_ARQ begins by multicasting the unacknowledged L3 data units currently residing in its send buffer. The whole multicast group will then receive the new L3 data units. Either the core network or the serving L2_ARQ entity will be responsible for this transmission. The serving L2_ARQ entity will then in addition continue to regularly send multicast messages to inform the passive L2_ARQ entities which L3 data units can be discarded from the send buffers. That is, information about the L3 data units that have been acknowledged by the peer L2_ARQ entity is multicast. When a handover occurs, the serving L2_ARQ entity will multicast a data unit discard message if new L3 data units have been acknowledged since the last discard message was sent. Alternatively, the serving L2_ARQ that is handing over the communication can transmit a multicast message that indicates with which L3 data unit to continue sending after handover.

In order to accomplish the above system, some kind of addressing scheme must be employed for the L3 data units. Any suitable or desirable scheme that uniquely identifies the L3 data units, and in the case of in-sequence delivery of L3 data units identifies the internal order, may be used.

One example for an addressing scheme is the use of sequence numbering for each L3 data unit. The precise implementation of such a scheme, e.g. the nature of a common protocol between the members of the multicast group, is of no relevance for the present invention, as long as the above described function is given.

Up to now, the buffer management and handling of L2_ARQ data units in an acknowledgment mode (the I-mode) were discussed. The management of the L2_ARQ data units of the non-acknowledgment mode (UI-mode) in the send buffer is somewhat different, but the handling after reset or after handover is basically the same. More specifically, the L2_ARQ data units that are in the UI-queue are simply deleted or discarded after having been sent. In this sense, the contents of the UI-queue in the send buffer always reflects those data units that have not yet been sent. When a reset or a handover occurs, the new L2_ARQ entity will simply continue the procedure by sending those L2_ARQ data units of the UI-mode that have not yet been sent. The process of bringing the L3 data units that have not yet been sent from the old L2_ARQ entity to the new L2_ARQ entity during a handover is exactly as described for the I-mode L2_ARQ data units. In other words, this can be done by direct transfer, by pushing back through the core network, or in the way of the above-described multicast group.

According to a preferred embodiment, the UI-mode data units are however treated somewhat differently, namely in the event of a reset or a handover, all those L2_ARQ data units that are associated with a L3 data unit for which only a part of the L2_ARQ data units was sent, are deleted prior to recommencing sending after the reset or the handover.

This has the advantage that an unnecessary transmission of L2_ARQ data units can be avoided. More specifically, one functionality of the L2_ARQ protocol will be that of error detection, which means performing an error check and discarding L3 data units that have incurred transmission errors. Typically, in the course of a reset or a handover, where parts of a given L3 data unit have been sent, said given L3 data unit will be incomplete and therefore discarded. As a consequence, the sending of the remaining L2_ARQ data units associated with said given L3 data unit is superfluous.

As already mentioned above, one of the advantages of the present invention is that no ARQ mode needs to be run above the L2_ARQ level. However, it is preferred that the L2_ARQ protocol implements some sort of error check and error control. For example, the receipt of faulty L3 data units should be recognized, and these faulty data units should be discarded. In this way, the system of the present invention becomes particularly effective, because then those I-mode L2_ARQ data units that only form part of an L3 data unit are discarded, and due to the buffer management of the present invention, the complete L3 data unit is sent thereafter (see above description of reset and handover with respect to I-mode L2_ARQ data units), such that the complete transmission of L3 data units is secured.

Consequently, the L2_ARQ implementation will not only be able to perform error detection on the L2_ARQ level (e.g. as will typically be associated with the acknowledgment mode for L2_ARQ data units), but will also be able to perform error detection on the L3 level.

One of the important advantages of the present invention is that it only requires the modification of a data unit sending means. This greatly simplifies the implementation of the present invention into existing systems.

Reference signs in the claims are intended for a better understanding and do not restrict the scope.

What is claimed is:

1. A method for controlling a data unit sender, said data unit sender having a send buffer for holding data units to be sent and said data unit sender being arranged to send data units of a first protocol to another peer of said first protocol, and embed data units of a second protocol belonging to a higher layer than said first protocol into data units of said first protocol, said method comprising:
    discriminating said data units of said second protocol whereby data units of the second protocol are distinguishable from one another,
    associating data units of said first protocol with data units of said second protocol, said associating step including keeping a record of which data units of the first protocol belong to which data units of the second protocol,
    controlling deletion of data units of the first protocol from the send buffer in accordance with said record.

2. The method according to claim 1, wherein said first protocol provides at least one acknowledgment mode in which the acknowledgment of correct receipt of data units sent to said other peer is provided, and said managing comprises deleting a given data unit of said first protocol that belongs to said acknowledgment mode from said send buffer only if acknowledgments for all data units of said first protocol associated with the same data unit of said second protocol as said given data unit of said first protocol have been received.

3. The method according to claim 1, wherein said data unit sender is a mobile station or a radio network node in a mobile communication network, and said first protocol controls a radio link.

4. A data unit sending means having a send buffer means for holding data units to be sent and said data unit sending means being arranged to send data units of a first protocol to another peer of said first protocol, and having
    an embedding means for embedding data units of a second protocol belonging to a higher layer than said first protocol into data units of said first protocol,
    a discriminating means for discriminating said data units of said second protocol whereby data units of the second protocol are distinguishable from one another,
    an associating means for associating data units of said first protocol with data units of said second protocol, said associating means comprising means for keeping a record of which data units of the first protocol belong to which data units of the second protocol,
    a control means for controlling deletion of the data units of the first protocol from the send buffer means in accordance with the record.

5. A data unit sender having a send buffer for holding data units to be sent and said data unit sender being arranged to send data units of a first protocol to another peer of said first protocol, and having
    an embedder for embedding data units of a second protocol belonging to a higher layer than said first protocol into data units of said first protocol,
    a discriminator for discriminating said data units of said second protocol whereby data units of the second protocol are distinguishable from one another,
    an associator for associating data units of said first protocol with data units of said second protocol, said associator comprising a memory for keeping a record of which data units of the first protocol belong to which data units of the second protocol,
    a controller for controlling deletion of the data units of the first protocol from the send buffer in accordance with the record.

6. The data unit sender according to claim 5, wherein said first protocol provides at least one acknowledgment mode in which the acknowledgment of correct receipt of data units sent to said other peer is provided, and said controller for managing the buffer is arranged to delete a given data unit of said first protocol that belongs to said acknowledgment mode from said send buffer only if acknowledgments for all data units of said first protocol associated with the same data unit of said second protocol as said given data unit of said first protocol, have been received.

7. The data unit sender according to claim 5, wherein said data unit sender is a mobile station or a radio network node in a mobile communication network, and said first protocol controls a radio link.

* * * * *